(12) United States Patent
Wang et al.

(10) Patent No.: US 8,220,735 B2
(45) Date of Patent: Jul. 17, 2012

(54) ADAPTIVE LOAD LIMITING RETRACTOR

(75) Inventors: Bin Wang, Windsor (CA); Frank Kiiskila, Leonard, MI (US); Daniel Webb, Oxford, MI (US); Jon E. Burrow, Ortonville, MI (US); Kurt W. Schulz, Romeo, MI (US); Chad Moore, Rochester Hills, MI (US); Gerald Keller, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 258 days.

(21) Appl. No.: 12/644,838

(22) Filed: Dec. 22, 2009

(65) Prior Publication Data

US 2011/0147509 A1 Jun. 23, 2011

(51) Int. Cl.
B65H 75/48 (2006.01)
(52) U.S. Cl. .................. 242/374; 242/379.1; 280/805
(58) Field of Classification Search .............. 242/374, 242/379.1; 280/805
See application file for complete search history.

(56) References Cited

U.S. PATENT DOCUMENTS

| | | | |
|---|---|---|---|
| 5,782,423 A | 7/1998 | Miller et al. | |
| 6,363,722 B1 | 4/2002 | Takehara et al. | |
| 6,419,176 B1 | 7/2002 | Mizuno | |
| 6,616,081 B1 | 9/2003 | Clute et al. | |
| 6,669,133 B2 * | 12/2003 | Palliser et al. | 242/379.1 |
| 6,722,600 B2 | 4/2004 | Hamaue et al. | |
| 6,969,022 B2 * | 11/2005 | Bell et al. | 242/379.1 |
| 7,124,974 B2 | 10/2006 | Shiotani et al. | |
| 7,240,924 B2 * | 7/2007 | Kohlndorfer et al. | 280/807 |
| 7,318,607 B2 | 1/2008 | Clute | |
| 7,410,113 B2 * | 8/2008 | Keller et al. | 242/379.1 |
| 7,410,114 B2 * | 8/2008 | Webber et al. | 242/379.1 |
| 7,429,012 B2 | 9/2008 | Loffler et al. | |
| 7,581,757 B2 | 9/2009 | Clute | |
| 7,878,439 B2 * | 2/2011 | Burrow et al. | 242/374 |
| 2002/0040582 A1 | 4/2002 | Kameyoshi et al. | |
| 2002/0060261 A1 | 5/2002 | Kameyoshi et al. | |
| 2006/0022447 A1 * | 2/2006 | Kohlndorfer et al. | 280/805 |
| 2006/0131456 A1 | 6/2006 | Romero | |
| 2007/0075173 A1 | 4/2007 | Boelstler et al. | |
| 2008/0061180 A1 | 3/2008 | Webber | |

FOREIGN PATENT DOCUMENTS

WO WO 2009/045132 4/2009

OTHER PUBLICATIONS

PCT International Search Report—110211.

* cited by examiner

*Primary Examiner* — Sang Kim
(74) *Attorney, Agent, or Firm* — Sally J. Brown; Brinks, Hofer, Gilson & Lione

(57) ABSTRACT

An adaptive load limiting seat belt retractor particularly adapted for motor vehicle applications. The retractor provides multiple levels of load limiting through the use of a pair of internal torsion bar elements. The torsion bar elements control the tension force on the seat belt webbing during an impact in a manner which provides desirable crash management characteristics. The retractor can be switched between high and low load limiting modes through activation of a pyrotechnic pretensioner. When the pyrotechnic pretensioner is not activated, the retractor provides a low load level characteristic. Pretensioner activation switches the retractor into a high load level operating condition. A high load limiting level is provided when the pretensioner is not activated if the spindle rotation exceeds a limited level in the low load limiting condition. A degressive load limiting feature may be provided to cause load limiting to begin at a higher level than the high load limiting level, and then step down the high load limiting level.

14 Claims, 7 Drawing Sheets

ADAPTIVE LOAD LIMITING RETRACTOR

FIELD OF THE INVENTION

This invention relates to a seat belt retractor of a type used as part of a seat belt occupant restraint system, particularly adapted for motor vehicle applications.

BACKGROUND OF THE INVENTION

Seat belt retractors are in common use in motor vehicles around the world as part of an occupant restraint system for providing occupant protection. Seat belt retractors store belt webbing which is deployed across an occupant in the typical so-called "active" type belt system, in which the occupant manually fastens the belt. The seat belt retractor typically incorporates a torsion rewind spring which enables an internal spindle to store a spool of seat belt webbing. The retractor allows extension of the belt during fastening and retraction when it is unfastened. The basic functions of the retractor are to provide convenient storage of belt webbing, enable occupant movement when the belt is fastened, and control the extension of belt webbing upon the occurrence of a crash event.

Significant advances have been made in recent decades in the area of motor vehicle occupant restraints. In addition to passive restraints, such as inflatable air cushion restraint systems, the area of belt restraint systems has also undergone significant advancement. Two areas of advancements in retractor design are particularly noteworthy. Pretensioning devices are often provided which are typically pyrotechnically actuated and forcibly wind up the belt retractor to reduce slack in the webbing upon the detection of a crash event. By reducing the slack in the webbing by pretensioning, the belt is able to couple with the occupant early in the crash sequence to provide control of the occupant's displacement relative to the vehicle. Taking up webbing slack and tightening the belt at the initial portion of the crash sequence also enables belt loading to be managed better while restraining the occupant. Pretensioning also helps provide proper positioning of the belt webbing on the occupant's body during a crash event.

Another area of significant development in seat belt retractors is providing seat belt webbing load limiting. Early retractors simply had spindles which were rigidly locked, typically by an inertia sensitive device which locked the spool to the retractor frame. Upon retractor locking, loads exerted on the belt webbing would result in some extension of the webbing through stretching of webbing and deflection of the retractor and other belt system components. However, the extension of the webbing in retractors without load limiting features was not tailored in a precise manner. Accordingly, these retractors could result in high loads applied to the occupant which can lead to less than optimal restraint performance. To improve performance, designers developed load limiting systems for retractors. Load limiting systems typically employ the use of a torsion bar coupled between the webbing spool and the inertial locking device which provides controlled torsional deflection in response to belt webbing loads. The presence of the torsion bar will "soften" the restraint characteristics of the belt retractor. In yet a further refinement of belt load limiting systems, multilevel load limiting systems have been implemented. These systems may have one, two, or more sections of torsion bar or other deformable elements which can be activated in a controlled manner, depending on a number of factors. For example, it may be desirable to provide a high belt load limiting characteristic when a high severity crash is occurring, or where a large and heavy occupant is involved. On the other hand, in lower severity impacts, lighter weight occupants may optimally be restrained with a less stiff load limiting characteristic. Retractors are presently known which have a pyrotechnic device which can be fired through a controller to select between high and low load limiting conditions, depending on a variety of factors, including those mentioned previously.

Providing retractors with increasing features has disadvantages, typically including the cost to provide these features, the complexity of the retractor, and the packaging size in the vehicle required for installation and operation of the retractor. Motor vehicle designers are constantly striving to reduce the mass, cost, and enhance the packaging efficiency of their products, including seat belt retractors.

SUMMARY OF THE INVENTION

In accordance with this invention, an adaptive load limiting seat belt retractor is provided which achieves many enhancements in view of the previously noted desirable characteristics. The seat belt retractor in accordance with an embodiment of this invention features a roto-type pretensioner which is activated by firing a micropyrotechnic gas generator. The retractor spool is coupled with high and low load limiting torsion bars. In one mode of operation, the pretensioner is not fired and in that condition, a relatively low belt load limiting retractor characteristic is provided. If, however, the pretensioner is activated, the pretensioner will lock the spindle assembly in such a manner that a high load limiting characteristic is activated. Accordingly, the retractor in accordance with this invention selects between high and low load limiting characteristics through the operation of the pretensioner. The retractor therefore does not require additional pyrotechnic activation components to provide selection between load limiting characteristics, and importantly, can be fit within the same packaging envelope of currently available seat belt retractors not having adaptive load limiting features. By eliminating the separate pyrotechnic activation device, an additional firing line and control system are not required for this retractor. In addition to the packaging advantages of the present invention, dual load limiting can be provided without significant cost penalties over existing retractors without that feature. This latter benefit is provided since the complexity and number of components are not significantly increased over standard function retractors.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
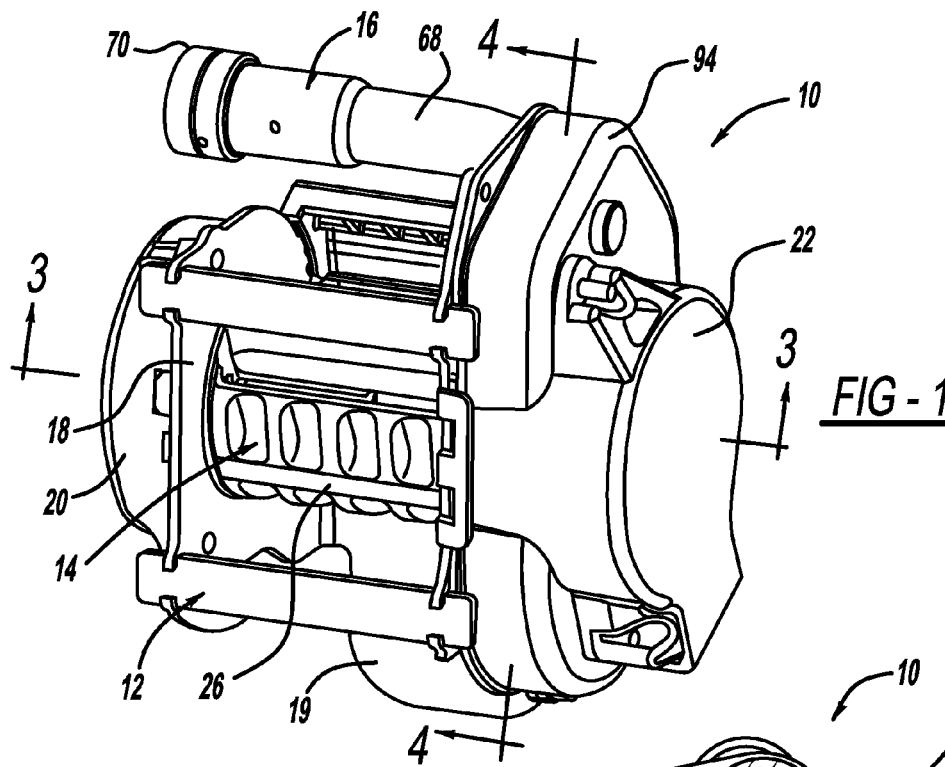
FIG. 1 is a pictorial view of a seat belt retractor in accordance with the present invention.

FIG. 1 illustrates seat belt retractor 10 in accordance with the present invention. Retractor 10 may be employed in a conventional three point active belt system, and can be used as part of single or dual retractor configurations. Seat belt retractor 10 has as major subsystems, including frame assembly 12, spindle assembly 14, and pretensioner assembly 16. Seat belt retractor 10 is used for allowing seat belt webbing (not shown) to be stowed on the spindle and for controlling the forces applied on the seat belt webbing during restraint operation, as will be described in greater detail in the following discussion.

Frame assembly 12 includes frame 18 which is generally formed from sheet metal stock and bent in a "U" shape and a pretensioner cover 94 that is connected to frame 18 by fasteners. Frame 18 includes means for mounting the retractor to a motor vehicle structure, principally through tab 19 with a bore for a threaded fastener or other fastening means (not shown). Frame 18 forms mounting surfaces for remaining components of the retractor. Torsion spring cap 20 is affixed to one end of frame 18 and includes an internal torsion spring (not shown) which exerts a torsional compliant force onto spindle assembly 14 for rewinding the belt webbing. Tread head assembly 22 is mounted to the opposite "leg" of frame 18. Tread head assembly 22 includes internal inertia sensitive components (not shown) of conventional design which cause locking of retractor 10 in response to vehicle deceleration of a predetermined magnitude. This operation of tread head assembly 22 is in accordance with well known prior art principles, and is not described in detail here. Tread head assembly 22 operates to provide an emergency locking retractor (ELR) function. This allows webbing to be freely paid-out from retractor 10, allowing movement of the occupant and extension of the seat belt webbing except when deceleration forces above a predetermined magnitude are acting on the retractor. The inertia sensors of seat belt retractors will cause tread head assembly 22 to lock, either in response to acceleration forces of a given magnitude and direction acting on the retractor, as well as in conditions where the motor vehicle is in an inclined condition when the inclined angle is greater than a predetermined magnitude. In these cases, tread head assembly 22 locks spindle assembly 14 to a pretensioner cover that is fixed to frame 18 as mentioned previously. Frame assembly 12 further includes a number of additional elements illustrated such as protective caps and other elements not directly related to the novel features of the present invention.

Figure 2:
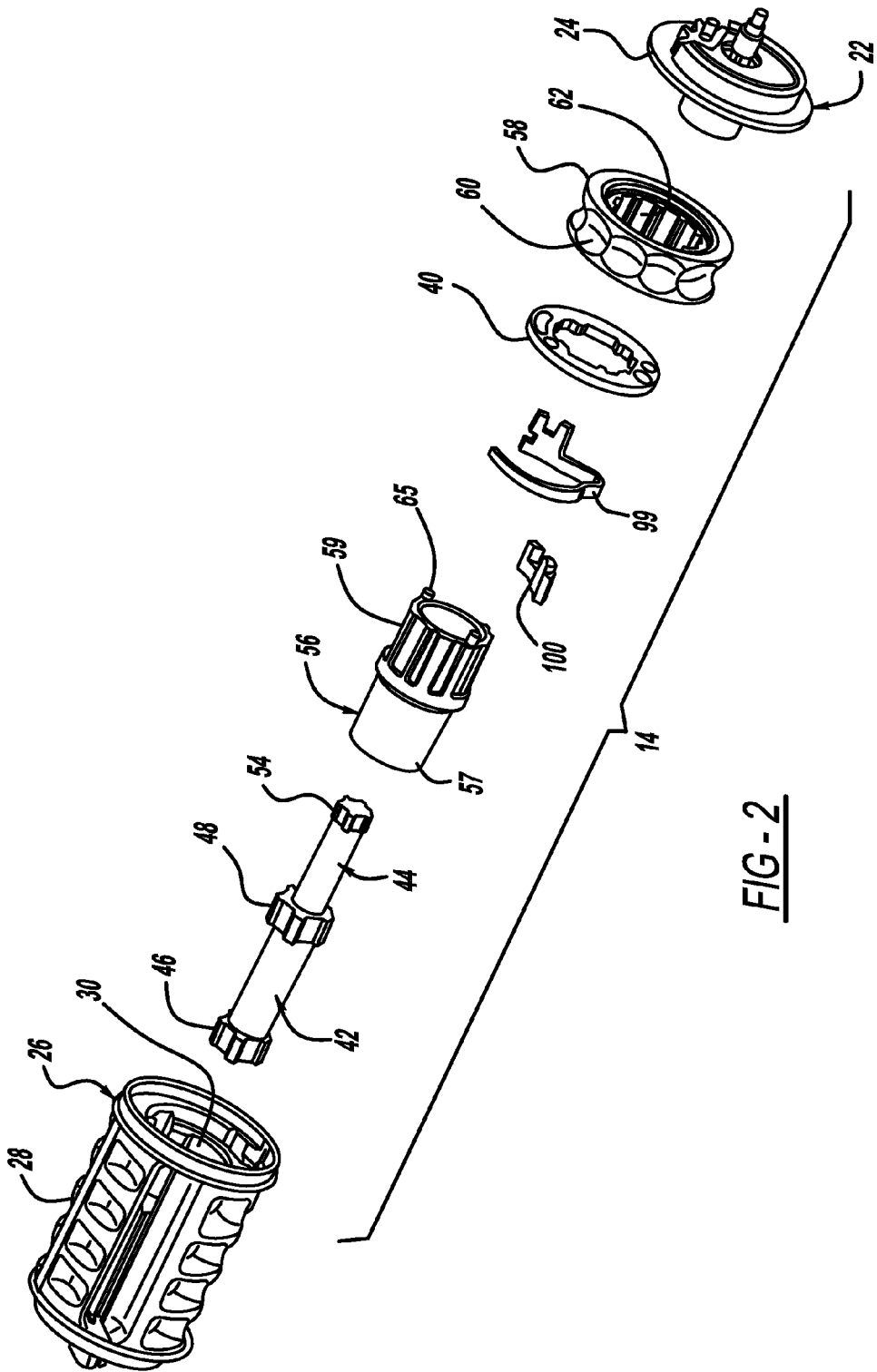
FIG. 2 is an exploded pictorial view of the spindle assembly components of the retractor shown in FIG. 1.
Figure 3:
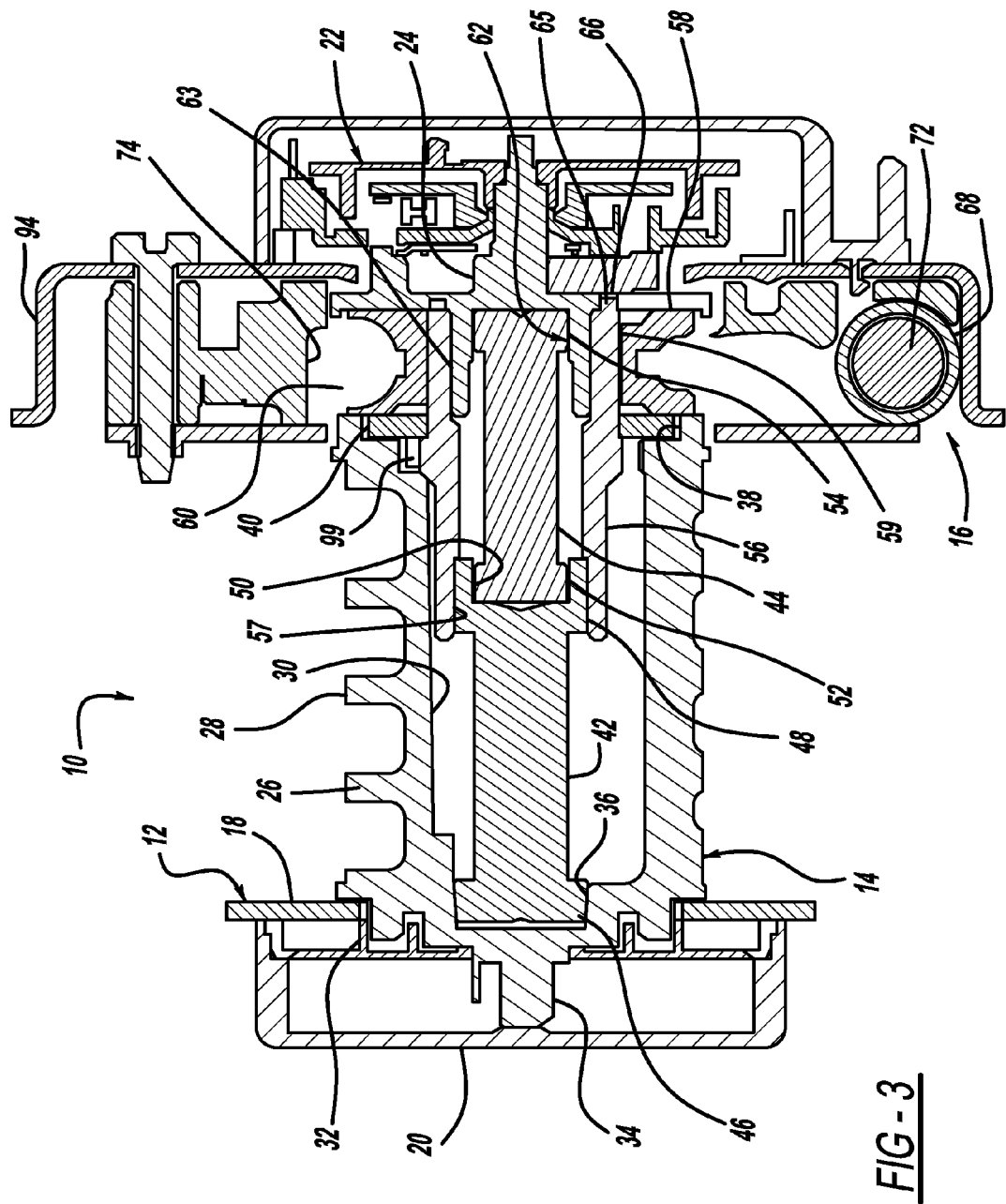
FIG. 3 is a cross-sectional view taken along line 3-3 through the retractor shown in FIG. 1.

Now with specific reference to FIGS. 2 and 3, the elements of spindle assembly 14 are illustrated. Spindle 26 (also known as a spool) provides an outer cylindrical surface 28 upon which seat belt webbing is wrapped. Spindle 26 further forms a hollow interior cavity 30 within which other components are installed. Spindle 26 is mounted into bearing cap 32 which allows the spindle to rotate relative to frame element 18. Spindle 26 further has a protruding post 34 along its longitudinal axis which extends into spring cap 20 and provides a means for a torsion rewind spring to engage with spindle 26. Spindle hollow interior cavity 30 forms a reduced diameter splined bore 36 at its end adjacent spring cap 20. Spindle 26 is open on its right hand end, as the parts are illustrated in FIG. 3. The open end forms a stepped internal bore, including a bearing bore surface 38 which receives bearing disc 40. Bearing disc 40 allows for free rotation of spool 26 during load limiting webbing extension.

Installed co-axially within hollow interior cavity 30 of spindle 26 is a pair of elongated torsion bars, including high load level torsion bar 42, and low load level torsion bar 44. Bar 42 has an enlarged head 46 which is splined to engage with spindle splined bore 36. The opposite end of torsion bar 42 forms an outer perimeter rim 48 which has external splines as well as a splined end bore 50 which receives a splined headed end 52 of low load level torsion bar 44. Torsion bar 44 further forms splined end 54. End 52 and end bore 50 have meshing splines. End 54 is splined into an internal splined bore 62 of tread head hub 24. Torque transfer tube 56 has one end 57 with internal splines which engage and mesh with torsion bar head 48, and an opposite end 59 having external splines.

Torsion bars 42 and 44 may be separately formed and assembled in a co-linear fashion as described previously. Alternatively, both torsion bars 42 and 44 could be formed in a unitary assembly which would form ends 46, and 54 and rim 48 and featuring low and high load limiting sections. Such a unitary element could appear as they are shown assembled in FIG. 2.

Pretensioner pinion 58 is splined or otherwise fastened to torque transfer tube 56 at end 59 and has an outer diameter forming pockets 60 which receive pretensioner ball elements, which will be described in more detail in the following sections. Ball pockets 60 enable pinion 58 to be rotationally driven during pretensioner operation.

Torque transfer tube end 59 is mounted over hub tube projection 63. This connection is preferably not splined and allows some relative rotation between tread head hub 24 and torque tube 56 during load limiting webbing extension. However, is preferable to have some means for limiting the relative rotation between these components for reasons which will be described in more detail when the operation of retractor 10 is described below. One means for providing limited angular rotation between hub 24 and torque tube 56 is to provide the torque tube with protruding pins or posts 65 fit within a circumferential groove 66 formed in the tread head hub 24. Preferably, groove 66 is formed to sweep an arc which has ends which will limit the possible relative angular rotation between these two components. Angular relative rotation of up to about 330 degrees is practical with this configuration. A degressive bending element 99 is interlocked through bearing disc 40 to torque tube 56 and coupled to spindle 26 by degressive insert 100.

As mentioned above, in some operating circumstances, some relative rotation between torque tube 56 and tread head hub 24 is desirable. However, it may be further desirable to limit such angular rotation until a torque load of given magnitude is exerted between these two components. For example, shear pins (not shown) could be installed between tread head hub 24 and torque tube 56 which would shear when a predetermined torque is applied between them. Another approach could feature a press-fit between these components which would permit relative rotation only after a predetermined torque is applied.

Figure 4:
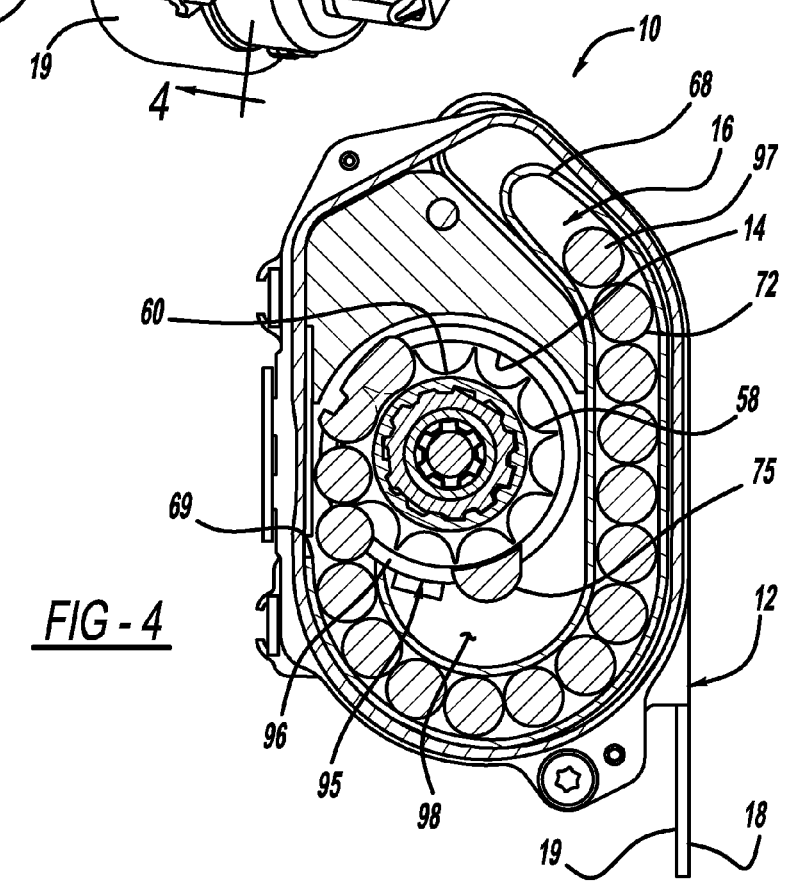
FIG. 4 is a side cross-sectional view taken along line 4-4 through the retractor shown in FIG. 1.

As best shown by FIGS. 1 and 4, pretensioner assembly 16 includes a formed hollow ball tube 68. At one end of ball tube 68, micropyrotechnic gas generator 70 is provided which is connected with an electrical firing line (not shown) and includes an internal chemical gas generating pellet (not shown). Ball tube 68 is loaded with a series of pretensioner balls or spheres 72. The end 69 of ball tube 68 opposite gas generator 70 exits at a position tangent with pinion 58. Pretensioner enclosure 74 confines balls 72 to engage with pinion ball pockets 60. In operation of pretensioner assembly 16, once a firing signal is sent along the control line, the micro gas generator 70 pyrotechnically generates gas pressure within ball tube 68. This rapid pressure pulse drives pretensioner balls 72 through the inside of ball tube 68 and forces them into engagement with pinion 58 and ball pockets 60. This operation, which is illustrated in FIG. 4, causes a winding of spindle 26 as the pretensioner pinion 58 is spun.

As pretensioner balls 72 are forced into engagement with pinion ball pockets 60 and a winding of pinion 58 occurs, one or more of the pretensioner balls 72 become jammed into position within enclosure 95. One of balls 72 is confined by pocket 60 and supported by tube wall 96. This action prevents pinion 58 from reverse rotation or being "back driven". Accordingly, once pretensioner assembly 16 is fired, spindle 26 undergoes pretensioning rotation, and once this is concluded, pinion 58 becomes locked to frame element 18. Various ramp surfaces or one-way "clutch" features can be provided to prevent back driving of pinion 58. One or more "high seal" balls or pistons 97 is provided which has an interference fit with the inside diameter of ball tube 68. This high seal piston 97 maintains gas pressure in tube 68. The gas pressure prevents the ball chain formed by balls 72 and 97 from moving in a backwards direction so as to prevent pinion 58 from rotating in a reverse direction. The interference fit of piston 97 also provides friction resistance to help to prevent reverse rotation of pinion 58. The high seal piston 97 can be spherical or cylindrical in shape and may be provided with various gas sealing features. Ball separator 75 separates balls 72 from pinion pockets 60 and leads the balls into a linear ball trap 98 after pushing the pinion 58. The linear ball trap 98 confines balls 72 in the same way as tube 68 and does not allow balls 72 to move in two or three dimensional space. The end of ball trap 98 is formed by the pinion or a block stopper (not shown). These features ensure that high seal piston 97 is not ejected so that the gas pressure can be kept in ball tube 68 from being back driven.

Figure 5:
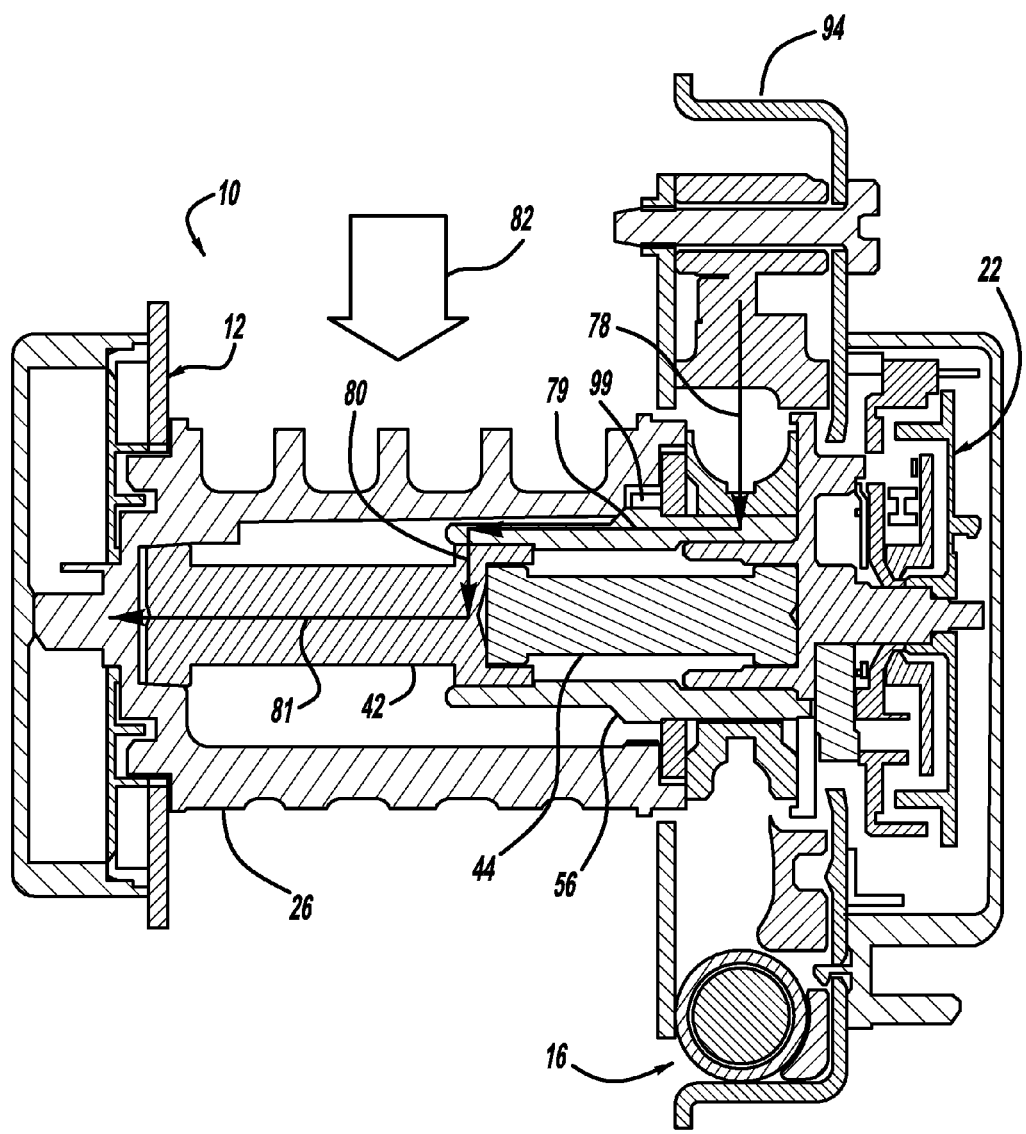
FIG. 5 is a cross-sectional view similar to FIG. 3 showing operation in the pretensioning mode.

Operation of seat belt retractor 10 will now be explained in more detail with particular reference to FIGS. 5, 6, and 7. These figures are identical to FIG. 3 except showing the loading paths through retractor 10 in various operational modes. To clarify FIGS. 5, 6, and 7, some element numbers of the described features are not shown as they would be repetitive of those shown in FIG. 3. FIG. 5 illustrates the operation of retractor 10 during pretensioning operation. This occurs once a firing signal is sent to gas generator 70 causing engagement of pretensioner balls 72 with pinion 58 as described previously. FIG. 5 illustrates the transfer of forces through spindle assembly 14 in that mode of operation. Arrow 78 indicates that rotational motion is exerted on pinion 58. Arrow 79 shows that this rotation is imparted through the splined connection to cause rotation of torque transfer tube 56. As designated by arrow 80, this rotation is also exerted on high load level torsion bar rim 48 and through to the opposite end 46 of torsion bar 42 shown by arrow 81, and then to spindle 26. Accordingly, activation of pretensioner assembly 16 is coupled to spindle 26 to cause pretensioning rotation which retracts belt webbing, as indicated by arrow 82.

Figure 6:
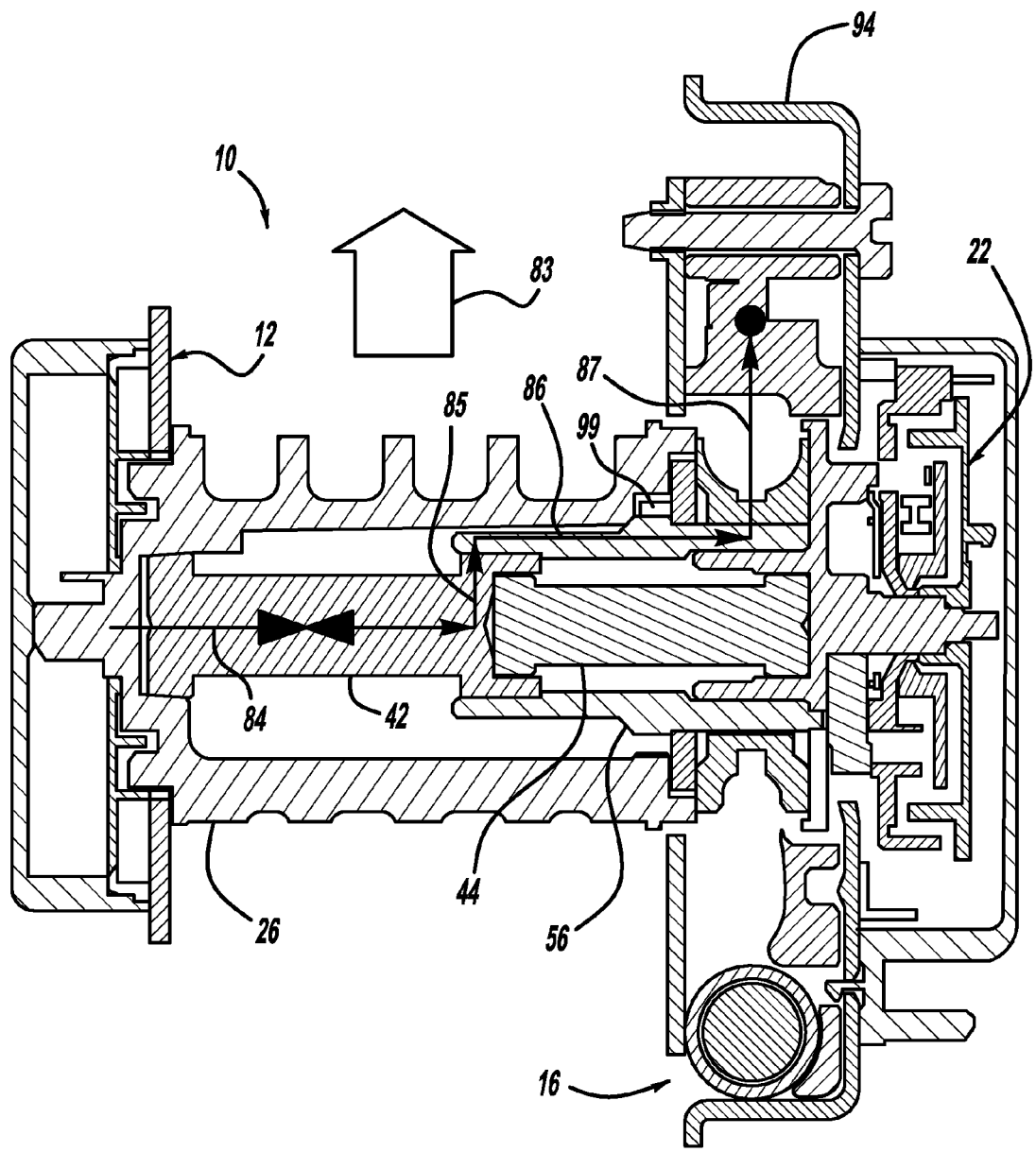
FIG. 6 is a cross-sectional view similar to FIG. 3 showing operating in a high load limiting condition.

FIG. 6 illustrates operation of seat belt retractor 10 in a high level load limiting mode. This mode is provided after the pretensioner assembly 16 is fired as described previously and as is shown in FIG. 5. After this firing, the pressure is kept by high seal piston 97 and the pretensioner balls 72 become jammed between enclosure 95 and pinion 58 as previously described. This action grounds pinion 58 to the retractor frame 18. After pretensioner firing, in the event that a load is applied on belt webbing wrapped on spindle 26 as indicated by arrow 83, this belt load produces a torsional load on spindle 26 which is transferred to high load level torsion bar 42 through the path previously described during pretensioner operations. Arrows 84, 85, 86, and 87 designate how the spindle torsional forces are coupled to frame 18 through the splined connections described above. Torsional forces are not in a significant magnitude exerted on low load level torsion bar 44. In this operation mode, torsional deflection and therefore belt load limiting is provided by controlled torsional deflection and deformation of high load level bar 42 as indicated by the double headed arrow heads shown along arrow 84.

Figure 8:
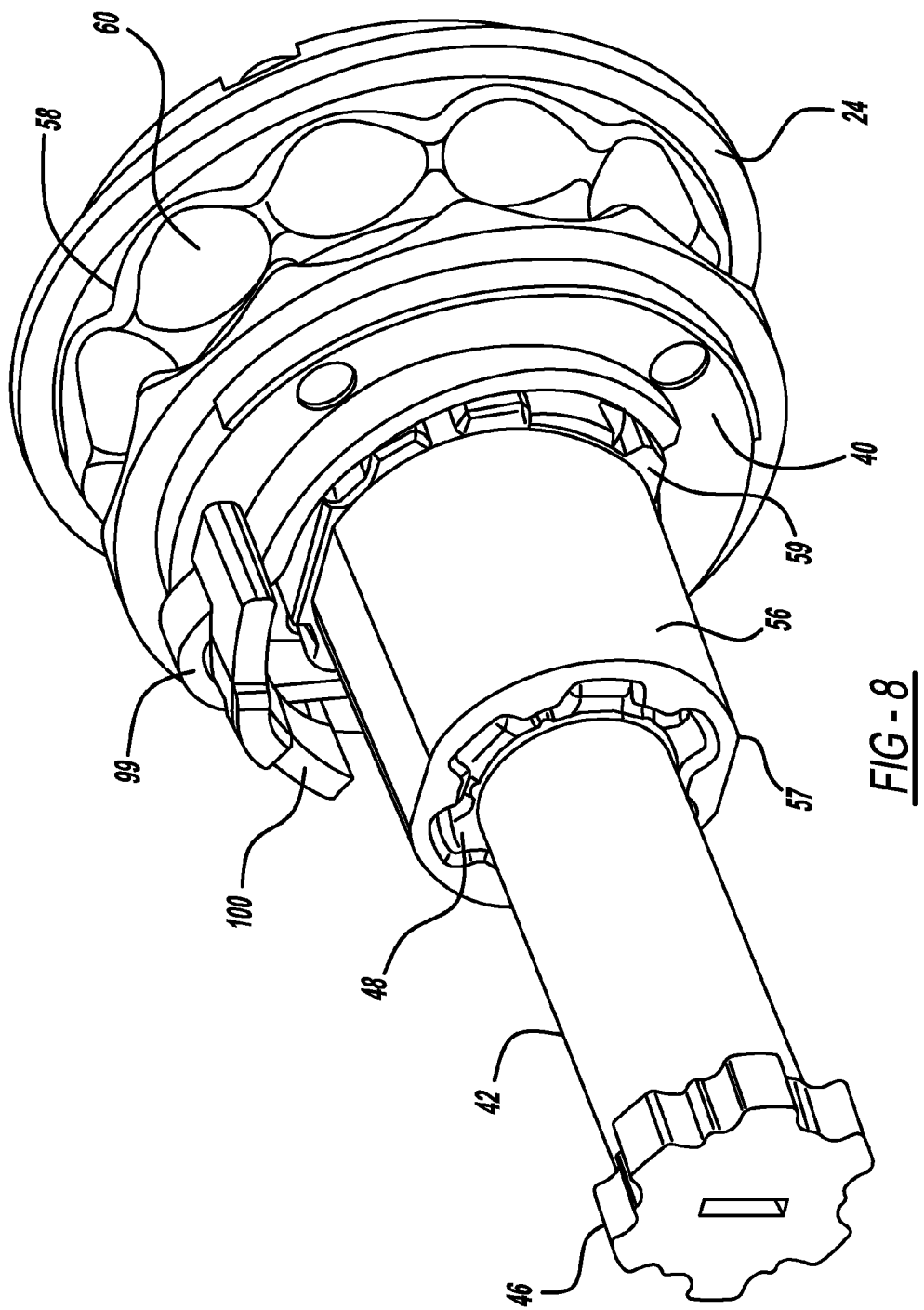
FIG. 8 is a pictorial view of portions of the spindle assembly of a retractor in accordance with this invention.

The high load limiting mode of operation of retractor 10 may also have degressive load limiting features. When degressive load limiting is desired, for example for large occupants, bending element 99 and degressive insert 100 can be installed. As the degressive bending element 99 is fixed to torque tube 56 through bearing disc 40 and the degressive insert 100 is in a pocket 101 in the spindle 26, the bending element will be pulled through from bending insert to provide degressive load while high load limiting is activated. These elements are best described with reference to FIG. 8. Adjustment of the thickness and length of bending element 99 provides various levels of degressive step down and duration. Accordingly, when high load limiting is effective following operation of pretensioner assembly 16, load limiting torsion is at a higher level than that provided by high load level bar 42 alone as degressive bending element 99 is deformed. Following deformation, load is transferred to high load level bar 42 which provides a step down in load limiting characteristic (albeit to a higher level then provided by low load level bar 44, as described below).

Figure 7:
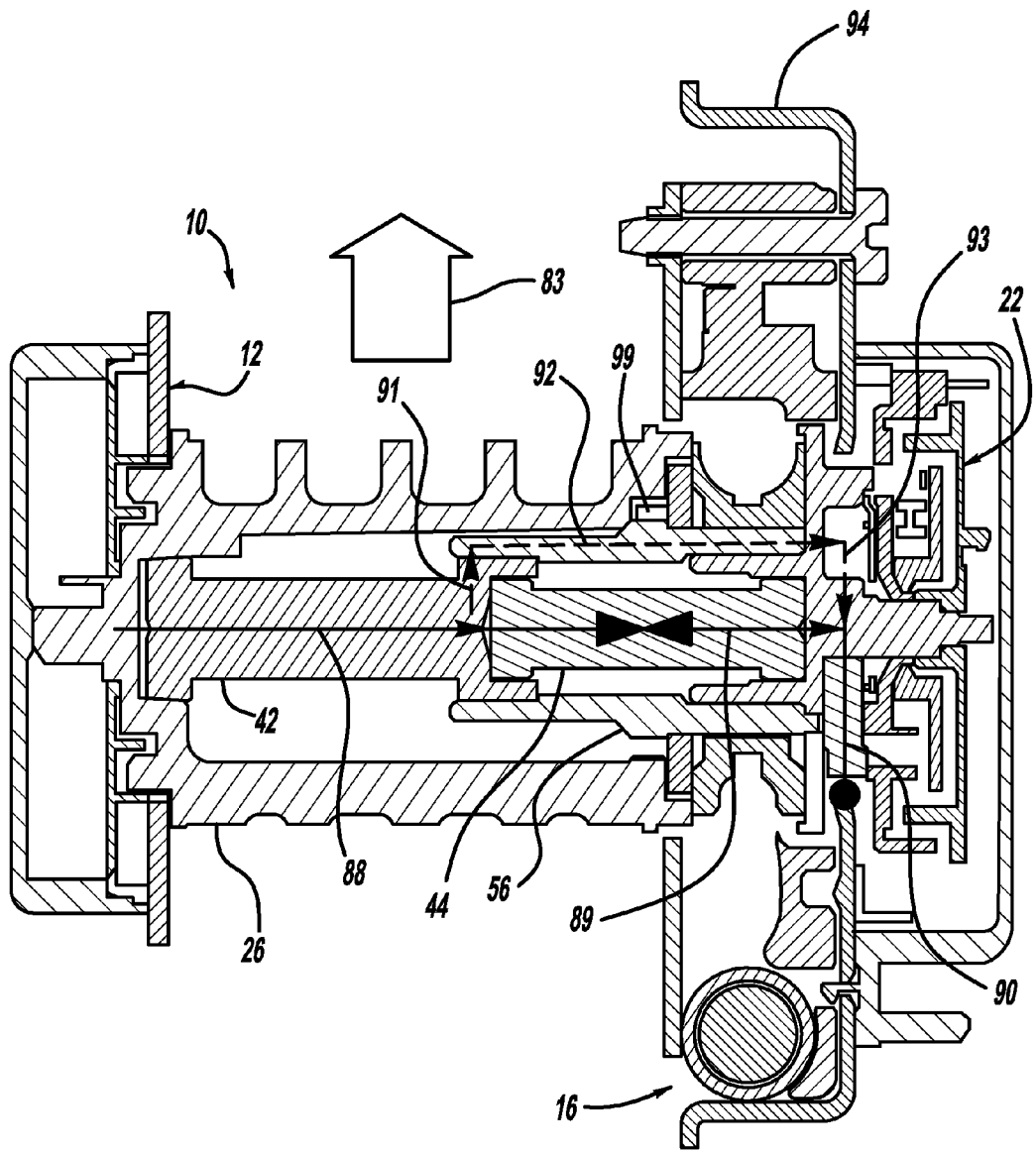
FIG. 7 is a cross-sectional view of a retractor in accordance with this invention similar to FIG. 3 showing the retractor operating in a low load limiting condition.

FIG. 7 illustrates an operating condition in which a belt load designated by arrow 83 is exerted on the belt webbing and therefore spindle 26 when the pretensioner assembly 16 has not been activated. In this condition, tread head hub 24 is grounded to retractor frame 18 through internal activation of conventional inertial locking elements. In the case that tread head hub 24 is locked in this manner, belt forces 83 produce torque on spindle 26 which is transferred through torsion bar 42, shown by arrow 88, through torsion bar 44 shown by arrow 89, and to pretensioner cover 94 shown by arrow 90.

In the mode of operation shown in FIG. 7, torsion bars 42 and 44 are torsionally loaded in a series manner. Accordingly, torsion loads are also exerted on high load level torsion bar 42. However, due to the lower torsional stiffness of low load level torsion bar 44, that torsion bar undergoes more torsional deflection and deformation than bar 42 and predominantly provides belt load limiting in this mode, as designated by the double headed arrow heads along arrow 89.

There could be operational scenarios in which high load level operation is desired even where pretensioner assembly 16 is not activated. The connection between torque tube 56 and tread head hub 24, as previously described, provides a limited degree of rotational relative motion when tread head 22 is locked. Accordingly, when low load level torsion bar 44 is undergoing deflection, such deflection can occur over a predetermined angle, for example 300 degrees or up to about 330 degrees. This relative rotation will occur between torque transfer tube 56 and hub 24 as low level torsion bar 44 is deformed. Once this predetermined relative rotation angle occurs, the torsional loads can be directly coupled to high load level torsion bar 42 through torque tube 56. This action is designated by the dotted line arrows 91, 92, and 93 in FIG. 7. This operation provides protection against excess deformation of low level torsion bar 44 when pretensioner assembly 16 has not been activated, or where the pretensioner fails to ground forces to frame 18 for any reason while tread head 22 is locked.

While the above description constitutes the preferred embodiment of the present invention, it will be appreciated that the invention is susceptible to modification, variation and change without departing from the proper scope and fair meaning of the accompanying claims.

The invention claimed is:

1. An adaptive load limiting seat belt retractor for seat belt webbing of a motor vehicle occupant restraint system, comprising:
   a retractor frame adapted to be mounted to the motor vehicle,
   a spindle assembly supported for rotation by the retractor frame assembly and having a spindle with a hollow interior and an outer surface adapted for winding the webbing, a first torsion bar and a second torsion bar positioned end to end and at least partially disposed within the spindle hollow interior, the first torsion bar having an end fixed to the spindle, the second torsion bar having an end coupled to a tread head hub, the first and second torsion bars arranged end to end and meeting at a rim, the rim coupled with a pretensioner pinion,
   a tread head mounted to the retractor frame and engaging the tread head hub to lock the spindle to the frame in response to inertial loads acting on the retractor, and upon locking with the spindle, tension loads acting on the seat belt produce torque on the spindle carried through the first and second torsion bars, which provides a low seat belt load limiting function, and
   a pretensioner assembly for causing the pinion to rotate the spindle for pretensioning the belt webbing and locking the pinion to the frame with tension loads acting on the seat belt produce torque on the spindle are coupled through the torsion bar rim and pinion and carried by the first torsion bar section, thereby providing a high seat belt load limiting function;
   a torque transfer tube positioned around at least one of the torsion bars and connected with the torsion bar rim at one end thereof and with the pretensioner pinion at another end thereof; and
   a connection between the torque tube and the tread head hub enabling limited relative rotation therebetween, and upon the limited relative rotation being exceeded, the torque tube and the tread head hub being rotationally coupled to transfer torque therebetween, whereupon the tension loads acting on the seat belt produce torque on the spindle carried by the first torsion bar, and provide the high seat belt load limiting function.

2. The adaptive load limiting seat belt retractor according to claim 1, further comprising a degressive element coupling the torque tube to the spindle to provide load transfer therebetween until a predetermined torsion load resulting from the tension loads acting on the seat belt is exceeded, whereupon relative rotation between the torque tube and spindle occurs as the first torsion bar is torsionally deformed.

3. The adaptive load limiting seat belt retractor according to claim 1, wherein one of the torque tube and the tread head hub forms a pin and the other of the torque tube or tread head hub forms an arcuate slot with the pin fit in the slot.

4. The adaptive load limiting seat belt retractor according to claim 3, wherein the pin and the arcuate slot permit the relative rotation between the torque tube and the tread head hub up to about 330 degrees.

5. The adaptive load limiting seat belt retractor according to claim 1, wherein the pretensioner assembly is a rotopretensioner having a gas generator, a pretensioner ball tube, pretensioner balls positioned inside the tube, and an enclosure partially surrounding the pinion, and upon activation of the gas generator, gas produced by the gas generator drives the balls into engagement with the pinion, thereby rotating the pinion.

6. The adaptive load limiting seat belt retractor according to claim 5, wherein the pretensioner spindle becomes locked to the retractor frame after activation of the pretensioner assembly.

7. The adaptive load limiting seat belt retractor according to claim 1, wherein the first and second torsion bars are formed by separate torsion bar elements which are joined together by splines.

8. The adaptive load limiting seat belt retractor according to claim 1, wherein the first torsion bar has a higher torsional stiffness than the second torsion bar.

9. An adaptive load limiting seat belt retractor for seat belt webbing of a motor vehicle occupant restraint system, comprising:
   a retractor frame adapted to be mounted to the motor vehicle,
   a spindle assembly supported for rotation by the retractor frame and having a spindle with a hollow interior and an outer surface adapted for winding the webbing, a first torsion bar and a second torsion bar positioned end to end and at least partially disposed within the spindle hollow interior, the first torsion bar having an end fixed to the spindle, the second torsion bar having an end coupled to a tread head hub, the first and second torsion bars arranged end to end and meeting at a rim, a torque transfer tube positioned around at least one of the torsion bars and connected with the torsion bar rim at one end thereof and with a pretensioner pinion at another end thereof, the rim coupled with a pretensioner pinion,
   a tread head mounted to the retractor frame and engaging the tread head hub to lock the spindle to the frame in response to inertial loads acting on the retractor, and upon locking with the spindle, tension loads acting on the seat belt produce torque on the spindle carried through the first and second torsion bars, which provides a low seat belt load limiting function, and
   a rotopretensioner assembly having a gas generator, a pretensioner ball tube, with pretensioner balls positioned inside the tube, and an enclosure partially surrounding the pinion, upon activation of the gas generator, gas produced by the gas generator drives the balls to engage the pinion, driving the pinion to rotate the spindle and locking the pinion to the frame with the spindle tension loads acting on the seat belt carried by the first torsion bar and the torque transfer tube, thereby providing a high seat belt load limiting function;
   a connection between the torque tube and the tread head hub enabling limited relative rotation therebetween, and upon the limited relative rotation being exceeded, the torque tube and the tread head hub are rotationally coupled to transfer torque therebetween, whereupon the tension loads acting on the seat belt produce torque on the spindle carried by the first torsion bar, and providing the high seat belt load limiting function.

10. The adaptive load limiting seat belt retractor according to claim 9, further comprising a degressive element coupling the torque tube to the spindle to provide load transfer therebetween until a predetermined torsion load resulting from the tension loads acting on the seat belt is exceeded, whereupon relative rotation between the torque tube and spindle occurs as the first torsion bar is torsionally deformed.

11. The adaptive load limiting seat belt retractor according to claim 9 wherein one of the torque tube or the tread head hub forms a pin and the other of the torque tube or spindle hub forms an arcuate slot with the pin fit in the slot.

12. The adaptive load limiting seat belt retractor according to claim 11 wherein the pin and the arcuate slot permits the relative rotation between the torque tube and the tread head hub up to about 330 degrees.

13. The adaptive load limiting seat belt retractor according to claim 9, wherein the first and second torsion bars are formed by separate torsion bar elements which are joined together by splines.

14. The adaptive load limiting seat belt retractor according to claim 9, wherein the first torsion bar has a higher torsional stiffness than the second torsion bar.

* * * * *